United States Patent
Pogorski

[15] 3,698,588
[45] Oct. 17, 1972

[54] THERMALLY INSULATED DEVICE

[72] Inventor: Louis A. Pogorski, Toronto, Ontario, Canada

[73] Assignees: The British American Oil Company Limited; Chemical Projects Limited, ; part interest to each

[22] Filed: Oct. 21, 1970

[21] Appl. No.: 82,567

Related U.S. Application Data

[62] Division of Ser. No. 765,471, Oct. 7, 1968, abandoned.

[52] U.S. Cl. ................................220/9 C, 220/15
[51] Int. Cl. ..............................................B65d 25/18
[58] Field of Search.220/9 LG, 9 C, 9 M, 15, DIG. 9; 52/406, 249; 138/144, 149

[56] References Cited

UNITED STATES PATENTS

| | | |
|---|---|---|
| 967,360 | 8/1910 | Funke....................138/149 X |
| 2,123,869 | 7/1938 | Walker..................220/DIG. 9 |
| 2,226,617 | 12/1940 | Kuenzli..................220/DIG. 9 |
| 2,677,938 | 5/1954 | Loveday..............220/9 LG X |
| 2,863,179 | 12/1958 | Gaugler........................52/406 |
| 2,867,035 | 1/1959 | Patterson, Jr. .........220/9 C X |
| 2,939,811 | 6/1960 | Dillon......................52/406 X |
| 2,967,152 | 1/1961 | Matsch et al.............220/9 LG |
| 3,119,415 | 1/1964 | Galloway et al........138/144 X |
| 3,491,910 | 1/1970 | Buckwalter et al......220/9 LG |

FOREIGN PATENTS OR APPLICATIONS

| | | |
|---|---|---|
| 1,118,238 | 11/1961 | Germany.................220/9 LG |
| 730,699 | 5/1955 | Great Britain ............220/9 M |

*Primary Examiner*—Joseph R. Leclair
*Assistant Examiner*—James R. Garrett
*Attorney*—Peter W. McBurney

[57] ABSTRACT

A thermally insulated device having an inner wall and an outer wall. A load-supporting thermal insulation is located between and contacts the inner wall only. The thermal insulation includes a flexible casing filled with compacted finely divided material. The thermal insulation is the sole supporting member bearing the load imposed by the inner wall.

2 Claims, 6 Drawing Figures

PATENTED OCT 17 1972
3,698,588
SHEET 1 OF 2
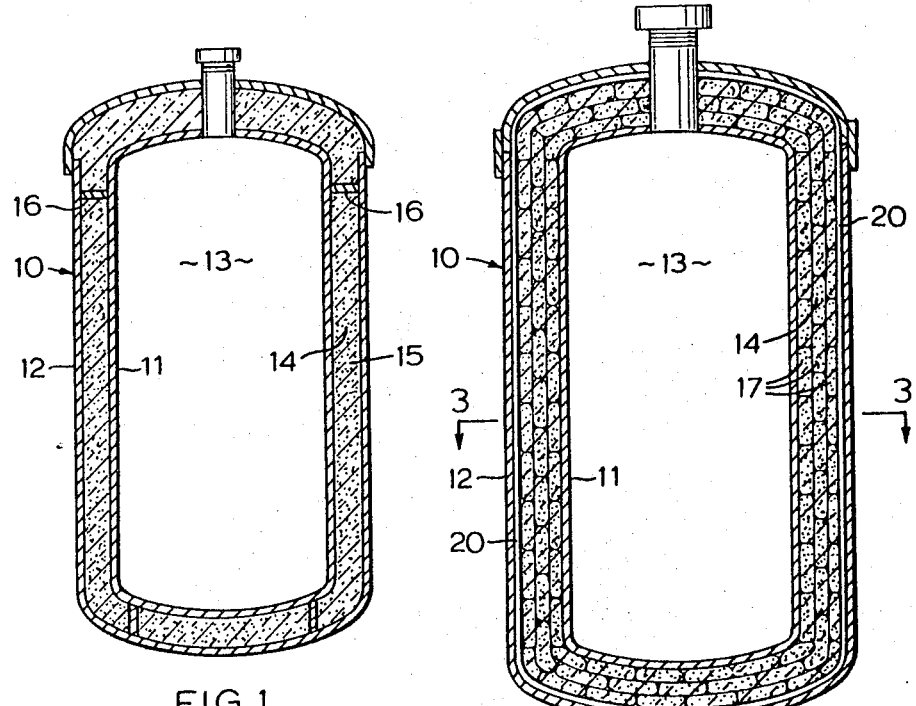
FIG. 1
(PRIOR ART)
FIG. 2
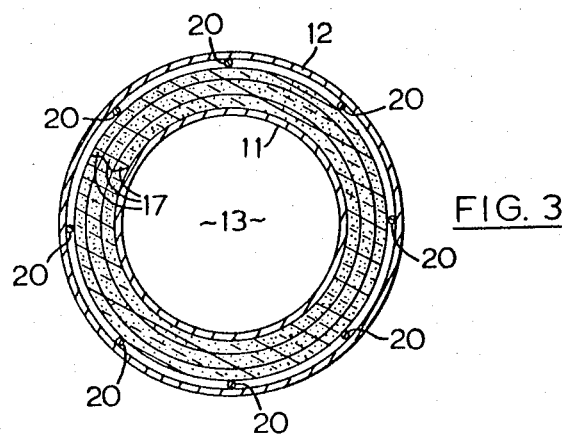
FIG. 3
INVENTOR.
LOUIS A. POGORSKI
BY Peter W. McBurney
Agent

THERMALLY INSULATED DEVICE

This application is a division of U.S. application Ser. No. 765,471 filed Oct. 7, 1968 now abandoned.

This invention relates to thermally insulated devices including load-supporting thermal insulation.

The main function of thermal insulation is to decrease to a minimum heat leak into or from an insulated system, whichever the case may be, in order to reduce the boil-off rate of a liquid or protect an instrument, transfer line, such as a pipe, or equipment from the effects of a heat source or a heat sink acting on the system. The increasing need for generation, storage and transfer of liquefied gases and of cryogenic fluids, as well as for the transport and operation of temperature-sensitive equipment on land, sea, under water, under ground, in the air or in space has created a demand for economical versatile and rugged types of efficient insulations capable of withstanding a wide range of service conditions (operating temperatures from close to absolute 0 up to and over 3000° F, operating pressures from vacuum to positive, thermal shocks, i.e., rapid, large temperature changes, compressive loads and mechanical vibration.

Although the specific requirements may vary from case to case, there is a growing demand for thermally efficient, economical, unevacuated or mildly evacuated, rugged, load-supporting thermal insulating systems having overall effective K values under actual service conditions of the order of 0.3–0.01 Btu inch/hr ft$^2$ ° F and lower.

Heat may be transferred from a heat source to a heat sink in three different ways: convection, conduction and radiation. The contribution of each of the above mechanisms to the overall heat transfer depends on the heat transfer medium as well as on the magnitude and level of the temperature driving force. Under certain conditions any one of the three mechanisms may become controlling, while, under other conditions, the contribution of two or of all the three modes of heat transfer may be significant.

Thermal insulation is made in general of a material having a low coefficient of thermal conductivity (K) and/or of materials chosen in such a way that heat transfer through the insulation by means of the three responsible mechanisms, or at least by the controlling mechanism, is reduced to a minimum. At normal temperature and pressure (NTP) the thermal conductivities of liquids generally are high, the thermal conductivities of solid thermal insulators are of the order of a few Btu inch/hr ft$^2$ ° F and the thermal conductivities of gases are in general an order of magnitude lower than that of solid thermal insulators being around one to a few tenths Btu inch/hr ft$^2$ ° F. By a skillful combination of component materials having low K values, certain desirable properties can be emphasized and other undesirable ones can be suppressed.

The resultant composite thermal insulations will have better overall thermal insulating properties than those of the individual components thereof. The characteristics and limitations of various types of typical thermal insulating systems are listed in Table 1 and are reviewed below.

TABLE 1.—CHARACTERISTICS OF VARIOUS TYPES OF TYPICAL THERMAL INSULATING SYSTEMS

| I | II | III | IV |
|---|---|---|---|
| Insulation type | Thermal conductivity range [1] | Pressure range (Torr) | Practical limitations under actual service condition |
| (a) Single phase: | | | |
| Solid type insulation | >1 | | Relatively high conductivity, relatively high density. |
| Gas type insulation | >0.01 | 10$^{-4}$ | Suppotts required, effective conductivity affected by heat leak through joining walls and supports of containing vessel. |
| (b) Multiphase: | | | |
| Solid foams type insulations | 0.2–0.4 | 100–760 | Cannot support heavy loads, effective conductivity increased due to support requirements, limited operating temperature range, combustible or destroyed by heat at 300–500° F. |
| Conventional powder and fiber types of insulation | 0.0014–0.2 | 10$^{-4}$–760 | Cannot support heavy loads, effective conductivity increased due to support requirements. |
| Multilayer | 0.0002–0.002 | 10$^{-5}$–10$^{-4}$ | Cannot support heavy loads, effective conductivity increased due to support requirements, high vacuum required, service temperature limitations (thermal destruction at high temperatures). |
| Reflecting shields in vacuum type insulations | 0.0001–0.01 | <10$^{-6}$ | Cannot support heavy loads, effective conductivity increased due to support requirements, high vacuum required. |

[1] Of the insulations as determined under laboratory conditions within the pressure range given in Column III, B.t.u. inch/hr. ft.$^2$, ° F.

a. Single Phase Insulations

Single phase insulations are in general homogeneous bodies most commonly made up of solids having low thermal conductivities. Their most serious limitations are relatively high heat conductivity and relatively high density, both limitations being due to the very nature of solid materials. Gas bodies confined between two walls at pressures ranging from below atmospheric to positive also can be considered single phase insulations and have limited applications.

Solid phase type insulations

Heat transfer due to the mechanism of conduction through a single phase solid body is relatively large in all presently known insulating materials, limiting the insulating capabilities of single phase solid insulations to K values around 1 Btu inch/hr ft$^2$ °F at around the ambient temperature level.

Gas phase type insulations

Gas phase insulations are generally inferior to the multiphase types of insulations due to the residual heat leak by all the heat transfer mechanisms and heat leak through the walls connecting the inner and outer part of the insulated system and through the supports required in most cases.

b. Multiphase Insulations

Multiphase insulations are composite structures generally made up of solid and gas phases. The most serious drawbacks common to all types of such insulations is their limited capacity to support loads. Other disadvantages of some multiphase insulation systems are high vacuum requirements and service temperature restrictions.

Solid foams type insulations

The thermal conductivity of the mixed phase solid foams is decreased, in relation to the conductivity of the solid material thereof, by the presence of gas (second phase)-filled cells within a solid body (first phase). The conductivity of a composite system of this type can be modified to a degree by controlling the size of the cells, employing gases with low K values for filling the gas space and by the use of partial vacuum in the cells. A limitation is imposed by residual heat leak through the solid walls, which cannot be made infinitely thin for structural as well as other reasons. Thin walls, for instance, favor a diffusion of more conductive gases or vapors from the environment into the insulation, resulting, in the case of cells filled with gases at subatmospheric pressure, in equilibrium of the gas pressure within the cells with that of the surroundings. This factor tends to limit the performance of the solid-foams type of insulations. In practice a compromise has to be reached between the strength and the overall conductivity of the insulation. The working K values of the solid-foams insulations generally are limited to the range attainable at around atmospheric pressure (around 0.2 Btu inch/hr ft$^2$ ° F).

Conventional powder or fiber types of insulation

The concept of using powders or loose fibers as the thermal insulating media permits a further reduction in heat conductivity to a level unattainable by the foam type insulations. In this case, continuity of heat transfer by the mechanism of direct heat conduction through a solid wall, which, in the case of solid foams could be decreased but not entirely eliminated, is almost completely interrupted by a gas interface surrounding the solid particles. The heat leak due to direct solid conduction is reduced to a limited number of solid-solid point contacts between the particles, most of the particle surface areas being screened by the residual gas film cushions, which, under normal conditions, adhere to the solid surfaces. The contribution of the solid conduction to the overall heat leak through a powder thus is minimized, as is evidenced by the fact that the overall conductivity of powders is only slightly affected by the conductivity of the powder material.

Powders or powder mixes opaque to thermal radiation are effective in decreasing the portion of heat leak attributable to this mode of heat transfer. The contribution of residual solid conduction and radiation being small, the theoretical limits of the thermal insulating capability of powders approach, and, when certain requirements are met, surpass the insulating properties of the interstitial gas. These requirements, which are predictable from the Kinetic theory of gases, indicate that the thermal conductivity of the solid gas system may be lower than the thermal conductivity of the interstitial gas at given temperature and pressure conditions when the dimensions of the gaps between the loosely-packed solids are comparable to or lower than the molecular free path in the gas phase.

The required conditions can be met by decreasing the interstitial gas pressure, and thus increasing the length of the molecular free path, by decreasing the particle size or by decreasing both. By employing these techniques, the conductivity of powder or loose fiber-filled thermal insulating systems can be decreased to a point where radiation and residual solid conduction through the point contacts will become dominant over convection. The thermal conductivities of properly formulated evacuated powder or fiber mixes can reach an efficient low of 0.01 to 0.002 Btu inch/hr ft$^2$ °F at moderately mild vacuums ($10^{-1}$ to $10^{-2}$ - $10^{-4}$ Torr).

Multilayer Type Insulation

Multilayer thermal insulation is an extension of the composite phase insulation concept. The powder-gas interface is replaced by a solid film-gas interface. The films usually are arranged in the form of a sandwich made of alternate layers of insulating and reflecting materials. The performance of this highly efficient type of insulation depends on the type of materials used, the number and thickness of the films, the physical and chemical characteristics of the sandwich layers, the amount of surface area and type of contacts between the layers, etc., and what is highly important, on maintaining a high operating vacuum level of the order of $10^{-4}$ to $10^{-5}$ Torr. At high operating vacuums, K values of the order of 0.0001 Btu inch/hr ft$^2$ ° F are obtainable.

Reflecting Shields in Vacuum

This highly efficient type of thermal insulation (K values of down to the order of 0.0001 Btu inch/hr ft$^2$ ° F) consists of a multiplicity of reflective radiation shields suspended in a vacuum. However, its practical applications are seriously limited by shield suspension problems and very high vacuum requirements ($>10^{-6}$ Torr).

The foregoing discussion of the prior art indicates that previous types of efficient thermal insulations have one or more undesirable characteristics, e.g., inability to support heavy loads, high vacuum requirements, limited operating temperature range, etc. Inability to support loads creates the necessity for relatively highly conductive solid supports which, apart from mechanical complications in the vessel structure and construction, increase the practical effective overall conductivity of the insulated system much above the theoretical values. High vacuums are difficult and costly to obtain and maintain, while a limited service temperature range narrows the applications of an insulation. Any of these factors is serious enough to considerably affect or limit the usefulness of such previous types of insulations.

In accordance with the instant invention there is provided a thermally insulated device having an inner wall and an outer wall, a thermal insulator being positioned between the walls and being the sole support extending between the walls of the device.

The thermal insulator may be that described and claimed in parent application Ser. No. 765,471 filed Oct. 7, 1968.

A thermal insulator constituting a preferred embodiment of the invention described in the above-mentioned parent application and which may be used in the present invention comprises a flexible casing filled with compacted material, the compacted material exerting a pressure over the whole inner surface of the casing of at least 1 pound per square inch and being in the form of finely divided particles. The compacted material has a coefficient of thermal conductivity less than that of the interstitial gas between the particles under the same conditions of temperature and pressure.

The casing may be gas permeable or impermeable, and the insulator may be in the form of a tube, a quilted blanket or a cushion, for example. The particles may be fibers, powders or fiber-powder mixes.

This invention will become more apparent from the following detailed description, taken in conjunction with the appended drawings, in which:

FIG. 1 is a sectional view through a typical, prior art, powder-in-vacuum, thermally insulated double wall container;

FIG. 2 is a sectional view similar to FIG. 1 but showing a thermally insulated device embodying the instant invention;

FIG. 3 is a sectional view along the line 3—3 in FIG. 2;

Figure 4:
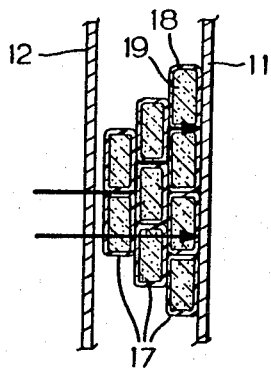
FIG. 4 is a view similar to FIG. 2 showing a part of the container thereof in greater detail than in FIG. 2.

The container 10 shown in FIG. 1 is of the double wall type having an inner wall 11 and an outer wall 12. Inner wall 11 defines a compartment 13 to be insulated and which may contain, for example, a liquefied gas.

The space 14 between inner wall 11 and outer wall 12 is filled with a powder 15 that serves as a thermal insulator. Since loose powders cannot support heavy loads or withstand vibration without settling, solid supports 16 are provided between inner wall 11 and outer wall 12, these supports serving to hold the inner and outer walls in fixed relative positions with respect to each other. The inner and outer walls of the container as well as supports 16 may be of metal or other material. The heat leak through supports 16, which, in general, is very high in relation to the heat leak through powder 15, materially reduces the effective thermal insulating capability of the system as a whole, i.e., the heat leak through supports 16 appreciably increases the thermal conductivity between walls 11 and 12. Furthermore, it is difficult and, in the case of larger vessels, almost impossible, to fill space 14 with fine powders to a desired and uniform density using conventional methods. Conventionally packed powders tend to settle with time, and the heat leak due to convection currents in the resulting voids decreases the effective efficiency of the thermal insulating system. This can be offset partially by evacuating space 14, but then wall 12 must be made heavy enough to prevent it from collapsing, and supports 16 also may have to be increased in thickness, which will increase the heat leak through supports 16. Moreover, the evacuation of large spaces filled with powders in a conventional manner is both difficult and time consuming.

Referring now to FIG. 2, there is shown a thermally insulated container embodying the instant invention. Although the container shown is like that of FIG. 1 and may be used, for example, for the storage of liquid oxygen, it will be appreciated that the invention is applicable to the insulation of any device that requires thermal insulation and is particularly suited for use with double wall containers or conduits such as pipe lines, for example. Container 10 of FIG. 2, like the container of FIG. 1, has an inner wall 11 and an outer wall 12, the inner wall defining a compartment 13. Disposed in the space 14 between walls 11 and 12 are three layers of thermal insulation 17. A thermal insulator constructed for use in the instant invention is best shown in FIG. 4 and consists of a flexible casing 18 filled with compacted material 19. The compacted material, which may be in powder form, in fiber form or a mixture of powders and fibers is compacted into flexible casing 18 to such an extent that it exerts a pressure over the whole inner surface of the casing.

Casing 18, being flexible, can be shaped and bent to follow the contours of the walls of a device to be insulated, although it will be appreciated that the thermal insulator will have greater rigidity as the pressure of the compacted material in casing 18 is increased. Casing 18 may be gas permeable or gas impermeable. The use of a gas permeable casing is particularly advantageous where the thermal insulator is to operate under partially evacuated conditions, since the permeability of the casing permits gas to be evacuated from within the casing after the casing has been placed in situ, as between walls 11 and 12 of container 10 of FIG. 2. Of course, if casing 18 is gas permeable, it should be essentially impermeable to the passage of particulate material 19 through the casing.

Casing 18 may be formed from a wide variety of materials such as, for example, glass fibers, quartz fibers, synthetic plastic or natural fiber (e.g., cotton or silk) sheets or fabrics. The choice of material for flexible casing 18 will depend upon such considerations as the pressure the casing is required to withstand, service temperature considerations and the degree of flexibility required.

As aforementioned, compacted material 19 consists of finely divided particles. The particles may be powders, fibers or mixtures of powders and fibers. A wide variety of particulate material can be employed, particularly since the material of which the particles is constituted does not itself have to be a good thermal insulator, although it is preferred that particles of a material having a low K value and relatively inexpensive be employed. Compacted material 19 may be quartz or glass fibers, aluminum powders (opaque to thermal radiation) or mixtures of fly ash with expanded silica to name only a few possibilities.

The size of the particles may vary widely, but, in general, will range between 10 A° and 2 mm. It has been found that a mixture of both large and small particles gives the best result. The shape of the particles is not a critical consideration.

An important feature of the invention is the fact that the finely divided particulate material 19 is compacted into flexible casing 19 and exerts a pressure over the whole inner surface of the casing. One result of this is to impart to the thermal insulator load-supporting capability. The pressure exerted by the particulate material on the casing may vary widely but generally will be between 1 and 300 lbs. per square inch. It is possible, however, that pressures in excess of 300 lbs. per square inch might be employed. The upper pressure limit is dictated by the strength of the flexible casing 18 in which the particulate material is compacted and the necessity to avoid crushing of the particles, which would undesirably increase surface area contact between the particles. Another advantage of having particulate material 19 compacted into casing 18 is that this minimizes any tendency for the particulate material to settle when subjected to vibrations.

For best results, the compacted material 19 should have a coefficient of thermal conductivity that is less than that of the interstitial gas between the particles under the same conditions of temperature and pressure. Under given conditions of temperature and pressure, this variable is dependent upon particle size and the degree of compaction.

The thermal insulator for use in the present invention may be made in a number of ways. The thermal insulator 17 of FIG. 4 is tubular in configuration and preferably is made by forcing the particulate material 19 into tubular casing 18 as the casing is formed, the degree of compaction obtained being dependent upon the rate of tube formation and the rate at which it is filled with the particulate material. After casing 18 has been so filled, it preferably is passed through a pair of rollers which further compacts the particulate material.

Referring again to FIG. 2, the space 14 between walls 11 and 12 is filled with three layers of a flexible, thermal insulator, the insulator being tubular in configuration and wrapped around the outer surface of wall 11. It is not necessary, of course, to employ a plurality of layers of insulation. Where a large space is to be insulated, however, it is preferred to employ a plurality of smaller layers rather than a single larger insulator, since the tendency for settling of particulate material 19 will be greater with the latter than with the former. Since the insulation can support heavy loads, it is not necessary to employ supports such as those indicated at 16 of FIG. 1, whereby the heat leak contributed thereby is avoided. The three layers of thermal insulation 17 shown in FIG. 2 constitutes the sole supporting member extending between the inner and outer walls of container 10 of FIG. 2. Since particulate material 19 is in compacted form, settling cannot occur, so the heat transfer characteristic of the insulation will remain unaffected by vibrations.

In assembling the container shown in FIG. 2, insulation 17 first may be wrapped around wall 11 and suitably secured thereto by tapes, nets or the like. The insulated container then may be placed inside wall 12, the top thereof being removable for this purpose.

If desired, spacers 20 shown in FIG. 3, that may be solid or hollow, corrugated or of other configuration and fabricated of metal or other material may be disposed between insulation 17 and outer wall 12, or inner wall 11 or both to form channels between one or both walls and the insulation to allow for easy evacuation. If desired, evacuation can be facilitated further by placement of suitable spacers between adjacent layers of insulation. Where evacuation in situ is contemplated, flexible casing 18 may be gas permeable. Of course, it also would be possible for the flexible casing to be gas impermeable and for the casing to be evacuated and sealed prior to use.

The heat leak paths through flexible, pre-stressed thermal insulation embodying this invention are shown by the arrows in FIG. 4. Heat leak takes place via the walls of the casings themselves and through the casing and the compacted particulate material. In view of the former it is desirable to make casings 18 thin, say, from 0.0005 inch to 0.01 inch, and of a material having a low thermal conductivity. It also is desired to stagger the layers of insulation as shown in FIG. 4 in such a way as to increase the length of the path through the casings per se from one wall of the vessel to the other.

Casings 18 can be seamless or with a seam, standard or reinforced and formed by sealing tape, stapling or stitching. Prestressed, powder-filled, flexible, tubular insulation consisting of a fiberglass or quartz fiber fabric casing and silica base powders are extremely heat resistant and can be applied in the temperature range of from close to absolute 0 to around 1200° F in the first case and up to in excess of 2500° F in the latter case.

Figure 5:
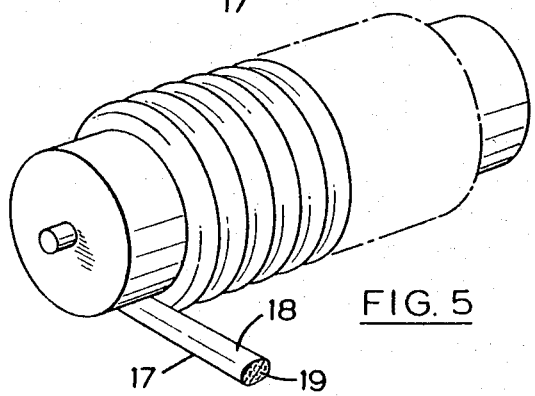
FIG. 5 is a perspective view of a roll of tubular type thermal insulation for use in this invention.
Figure 6:
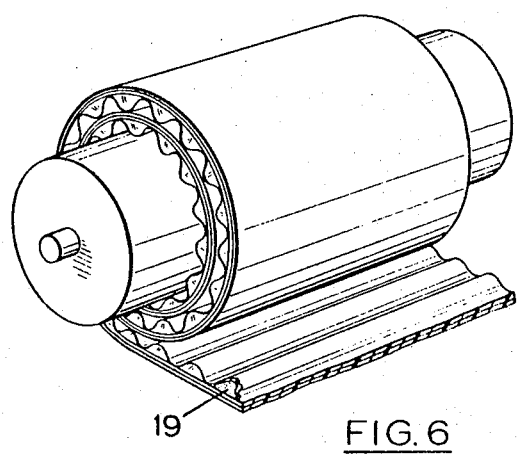
FIG. 6 is a perspective view of a quilted blanket type thermal insulator for use in this invention.

In FIG. 5 there is shown a roll of tubular, flexible, prestressed thermal insulation 17 for use in this invention. The insulation can be formed as an endless tube that can be cut into sections of desired length upon sealing of the ends thereof. As an alternative, the insulation may be in the form of a quilted blanket, such as is shown in FIG. 6, the quilting being effected by stitching or stapling. Those skilled in the art will appreciate that thermal insulation for use in the instant invention may assume forms other than those illustrated in FIGS. 5 and 6. Thus, prestressed, powder or fiber-filled pancakes or cushions for vessel supports, and prestressed, powder or fiber-filled bellows or sleeves for pipe line insulation may be fabricated utilizing the principles outlined above.

By way of example, a mixture of 50 percent by volume of ash and 50 percent by volume expanded silica having a particle size of from 150A° to 0.5 microns was compacted into a casing to withstand a pressure of 120 lbs. per square inch, the casing being of 4 thou fiberglass cloth (60 warp and 58 weft - plain weave). This insulation was wrapped in three 1-inch layers around the inner wall 11 of a double wall, liquid nitrogen container of the type shown in FIG. 2 and then placed within outer wall 12. The vessel had no supports 16 and was filled with 120 lbs. of liquid nitrogen. Space 14 was evacuated to 1 Torr.

The following table shows the effective overall conductivity of the insulated system after having been subjected to various tests:

| Type of Tests | Actual effective overall conductivity of the insulated system Btu inch/hr ft² °F |
|---|---|
| a. Stationary container | 0.01 ± 15% |
| b. container driven on a truck over country roads for 350 miles | 0.01 ± 15% |
| c. container subject to 20 cps vibrations for a period of 150 hrs. | 0.01 ± 15% |

It is to be understood that while the thermal insulator can be placed in a partially evacuated environment between the walls of the container, this is not essential, and it may be located in an environment of air or other gas, such as nitrogen, argon, helium, carbon dioxide and freon, at pressures ranging from subatmospheric to above atmospheric.

What I claim is:

1. A thermally insulated device having an inner wall, an outer wall, spacing means contacting the inner surface of said outer wall and having its innermost surface spaced from the outer surface of the inner wall, and load-supporting thermal insulation between said walls and contacting the outer surface of said inner wall and the inner most surface of said spacing means and maintaining said insulation in spaced relation to the inner surface of said outer wall, said thermal insulation comprising a flexible gas-permeable casing filled with compacted prestressed finely divided particulate material, said particulate material being prestressed to from 1 to 300 pounds per square inch, said thermal insulation being capable of supporting a load of from 1 to 300 pounds per square inch and constituting the sole supporting member extending between said inner wall and said spacing means, said device having an overall thermal conductivity between said walls of the order of 0.01 Btu/hr. ft$^2$ °F/in.

2. The device of claim 1 wherein the space between said walls is maintained under a partial vacuum.

* * * * *